(12) United States Patent
Schultz et al.

(10) Patent No.: US 7,802,081 B2
(45) Date of Patent: Sep. 21, 2010

(54) EXPOSED SEQUESTERED PARTITION APPARATUS, SYSTEMS, AND METHODS

(75) Inventors: Thomas Schultz, Hillsboro, OR (US); Saul Lewites, Aloha, OR (US)

(73) Assignee: Intel Corporation, Santa Clara, CA (US)

(*) Notice: Subject to any disclaimer, the term of this patent is extended or adjusted under 35 U.S.C. 154(b) by 1299 days.

(21) Appl. No.: 11/241,247

(22) Filed: Sep. 30, 2005

(65) Prior Publication Data

US 2007/0168399 A1 Jul. 19, 2007

(51) Int. Cl.
*G06F 1/00* (2006.01)
*G06F 13/36* (2006.01)

(52) U.S. Cl. .............. 713/1; 713/2; 713/300; 713/320; 709/25; 712/13; 711/129; 711/153

(58) Field of Classification Search .......... 713/1, 713/2, 300, 320; 709/25; 712/13; 711/129, 711/153
See application file for complete search history.

(56) References Cited

U.S. PATENT DOCUMENTS

| 6,094,699 | A | * | 7/2000 | Surugucchi et al. | 710/314 |
| 6,763,458 | B1 | * | 7/2004 | Watanabe et al. | 713/100 |
| 7,516,336 | B2 | * | 4/2009 | Rothman et al. | 713/300 |
| 2002/0129245 | A1 | * | 9/2002 | Cassagnol et al. | 713/168 |
| 2006/0156399 | A1 | | 7/2006 | Parmar et al. | |

* cited by examiner

*Primary Examiner*—Abdelmoniem Elamin
(74) *Attorney, Agent, or Firm*—Schwegman, Lundberg & Woessner, P.A.

(57) ABSTRACT

Apparatus, systems, methods, and articles may operate to store one or more parameters associated with a pseudo-device in a device configuration table associated with a first partition within a multi-partition computing platform. An inter-partition bridge (IPB) may be exposed to an operating system executing within the first partition. The IPB may be adapted to couple the first partition to a second partition sequestered from the first partition. The IPB may be configured by the parameter(s) associated with the pseudo-device. Other embodiments may be described and claimed.

24 Claims, 3 Drawing Sheets

EXPOSED SEQUESTERED PARTITION APPARATUS, SYSTEMS, AND METHODS

RELATED APPLICATION

This application is related to U.S. application Ser. No. 11/027,253 filed

TECHNICAL FIELD

Various embodiments described herein relate to computing systems generally, including apparatus, systems, and methods used to expose a hidden partition to an operating system.

BACKGROUND INFORMATION

Modern computing systems may utilize multiple sets of processing resources, including perhaps processing cores, hyper-threads, and memory. A set of processing resources may be referred to herein as a "partition." An operating system (OS) may derive partition information from a basic input-output system (BIOS) in the form of device configuration tables. One such table may be structured as a set of advanced configuration and power interface (ACPI) tables. The BIOS may populate the ACPI table(s) with partition information, including resources discovered at system initialization.

It may be possible to hide one or more partitions from the OS. Random access memory (RAM) may be hidden, perhaps by reporting to the OS a subset of discovered resources excluding the RAM. Peripheral component interconnect (PCI) devices may also be hidden, perhaps by setting a bit-mask in an input-output (IO) controller hub. The resulting execution environment may include a partition invisible to the OS, referred to herein as a "sequestered partition."

DETAILED DESCRIPTION

Figure 1:
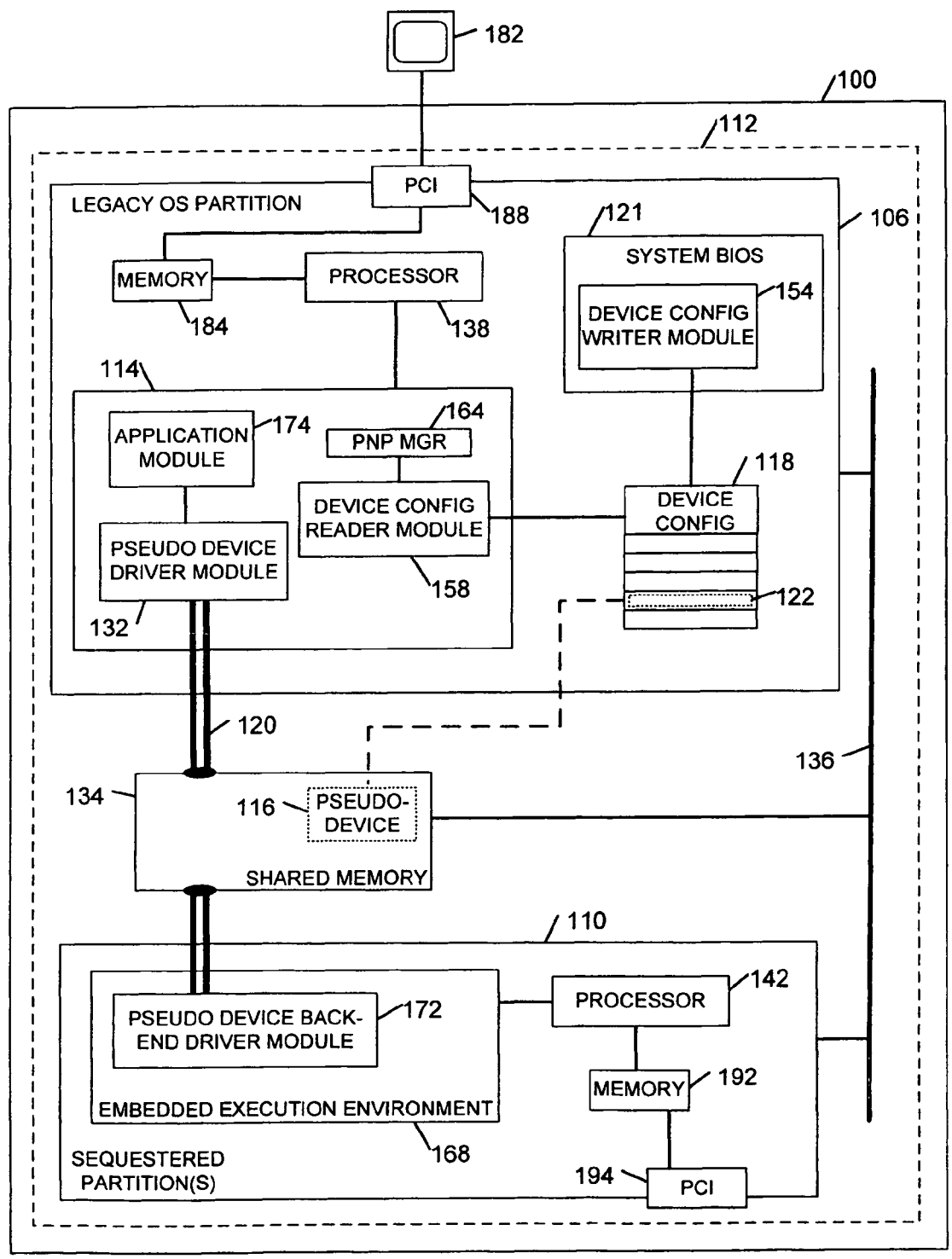
FIG. 1 is a block diagram of an apparatus and a representative system according to various embodiments of the invention.

FIG. 1 comprises a block diagram of an apparatus 100 and a system 180 according to various embodiments of the invention. Some embodiments described herein may comprise a mechanism to expose one or more sequestered partitions in a computing platform, perhaps to an OS 114 running in a legacy partition. "Legacy partition" as used herein means a general-purpose, non-embedded partition. The sequestered partition(s) may be exposed without requiring hardware modifications to the computing platform. The OS 114 may run on a boot-strap processor and the sequestered partition(s) may comprise one or more application processor(s). The sequestered partition(s) may be used for a variety of applications, including offloading of computationally-intensive tasks, system management, and fault prediction, among others. "First partition" and "legacy partition" may be used interchangeably herein; and "second partition" may be used interchangeably with "sequestered partition."

Some embodiments of the invention may add a non-physical "pseudo-device" 116 to a device configuration table 118. The pseudo-device 116 may represent the sequestered partition(s) to the OS 114 without requiring that an actual hardware device representation of the sequestered partition(s) exist in the legacy partition. An OS plug and play (PnP) manager may treat the pseudo-device 116 as a real device, however, and may prompt for the installation of a driver. The driver may implement an OS side of an inter-partition bridge (IPB) 120 useful for communicating between the legacy partition and the sequestered partition(s). The driver may present itself to the OS 114 as one of many device classes, thus enabling applications running under the OS 114 to use the sequestered partition(s) as a multi-purpose device. A structure for an exchange of information between the OS 114 and the sequestered partition(s) may result.

The device configuration table 118 may comprise one or more tables within a set of ACPI tables produced by a BIOS 121 and parsed by the PnP manager. The ACPI table(s) may be built by the BIOS 121, perhaps prior to completion of an OS boot. The ACPI table(s) may contain descriptions of system devices or operational parameters related to the system devices. An early-loading driver may modify the ACPI table(s) to include a pseudo-device description or operational parameters related to the pseudo-device 116. In some embodiments, a configuration menu associated with the BIOS 121 may be used to enter the device parameters into the ACPI table(s) to create the pseudo-device description. It is noted that the legacy partition and the sequestered partition(s) may share the BIOS 121 in some embodiments. In some embodiments, the sequestered partition(s) may initiate operations under the control of a separate BIOS.

The apparatus 100 may thus include a first partition 106 and a second partition 110 in a multi-partition computing platform 112. The second partition 110 may be sequestered from an OS 114 associated with the first partition 106. A device configuration table 118 may be located within the first partition or elsewhere, and may contain one or more parameters 122 associated with the pseudo-device 116. A parameter 122 may comprise a PnP device identification number, for example.

The device configuration table 118 may comprise a table associated with one or more ACPI tables. The device configuration table 118 may, for example, be located within an ACPI table, including perhaps within a differentiated system description table (DSDT). Or the device configuration table 118 may comprise a sub-set of one or more ACPI tables. The parameter(s) 122 may be used to configure an IPB 120 established to couple the first partition 106 to the second partition 110.

The apparatus 100 may also include a pseudo-device driver module 132 coupled to the OS 114 to pass data to the IPB 120. In an example embodiment, the IPB 120 may comprise a shared memory area 134 accessible by both the first partition 106 and the second partition 110. A bus 136 may couple together the shared memory area 134, the first partition 106, and the second partition 110. A first processor 138 in the first partition 106 may be communicatively coupled to one or more second processors 142 in the second partition 110 to interrupt the second processor(s) 142. The first processor 138 may thereby advise the second processor(s) 142 of a pending communication from the first partition 106 to the second partition 110 on the IPB 120. Likewise, the second processor(s) 142 may be adapted to interrupt the first processor 138 to advise of a pending communication from the second partition 110 to the first partition 106 on the IPB 120. The first processor 138 may comprise a bootstrap processor and the second processor(s) 142 may comprise application processor(s).

The apparatus 100 may also include a device configuration writer module 154 coupled to the device configuration table 118 to write the parameter(s) 122 to the device configuration table 118. In some embodiments, the device configuration writer module 154 may accept an operator input of the parameter(s) 122 for writing to the device configuration table 118. A device configuration reader module 158 may also be coupled to the device configuration table 118. The device configuration reader module 158 may read the parameter(s) 122 during an initialization of the OS 114. A PnP manager 164 coupled to the device configuration reader module may recognize that the parameter(s) 122 were stored in the device configuration table 118. The PnP manager 164 may consequently activate the pseudo-device driver module 132.

The apparatus 100 may further include an embedded execution environment 168 within the second partition 110 to manage processes executing within the second partition 110. A pseudo-device back-end driver 172 within the embedded execution environment 168 may transfer data between the embedded execution environment 168 and the IPB 120.

An application module 174 coupled to the pseudo-device driver module 132 may utilize the second partition 110 to perform a specialized processing function. Specialized tasks such as platform management, encryption/decryption, and fault prediction may be offloaded from the first partition 106 to the second partition 110.

In another embodiment, a system 180 may include one or more of the apparatus 100 as previously described. The system 180 may also include a display 182 coupled to a first partition 106 to display processed data. The display 182 may comprise a cathode ray tube display or a solid-state display such as a liquid crystal display, a plasma display, or a light-emitting diode display, among others.

The first partition 106 may include a first memory 184 coupled to a first processor 138. A first PCI device 188 may be coupled to the first memory 184, perhaps to transfer the processed data. A second partition 110 may include a second memory 192 coupled to one or more second processors 142. A second PCI device 194 may be coupled to the second memory 192 to effect input-output operations associated with the second partition 110.

Any of the components previously described can be implemented in a number of ways, including embodiments in software. Thus, the apparatus 100; partitions 106, 110; computing platform 112; OS 114; pseudo-device 116; device configuration table 118; inter-partition bridge (IPB) 120; BIOS 121; parameter(s) 122; driver modules 132, 172; shared memory area 134; bus 136; processors 138, 142; writer module 154; reader module 158; PnP manager 164; execution environment 168; application module 174; system 180; display 182; memories 184, 192; and PCI devices 188, 194 may all be characterized as "modules" herein.

The modules may include hardware circuitry, single or multi-processor circuits, memory circuits, software program modules and objects, firmware, and combinations thereof, as desired by the architect of the apparatus 100 and system 180 and as appropriate for particular implementations of various embodiments.

The apparatus and systems of various embodiments can be used in applications other than exposing a sequestered partition to an OS in a legacy partition on the same computing platform. Thus, various embodiments of the invention are not to be so limited. The illustrations of apparatus 100 and system 180 are intended to provide a general understanding of the structure of various embodiments. Other combinations may be possible.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, hand-held computers, tablet computers, etc.), workstations, radios, video players, audio players (e.g., mp3 players), vehicles, and others. Some embodiments may include a number of methods.

Figure 2:
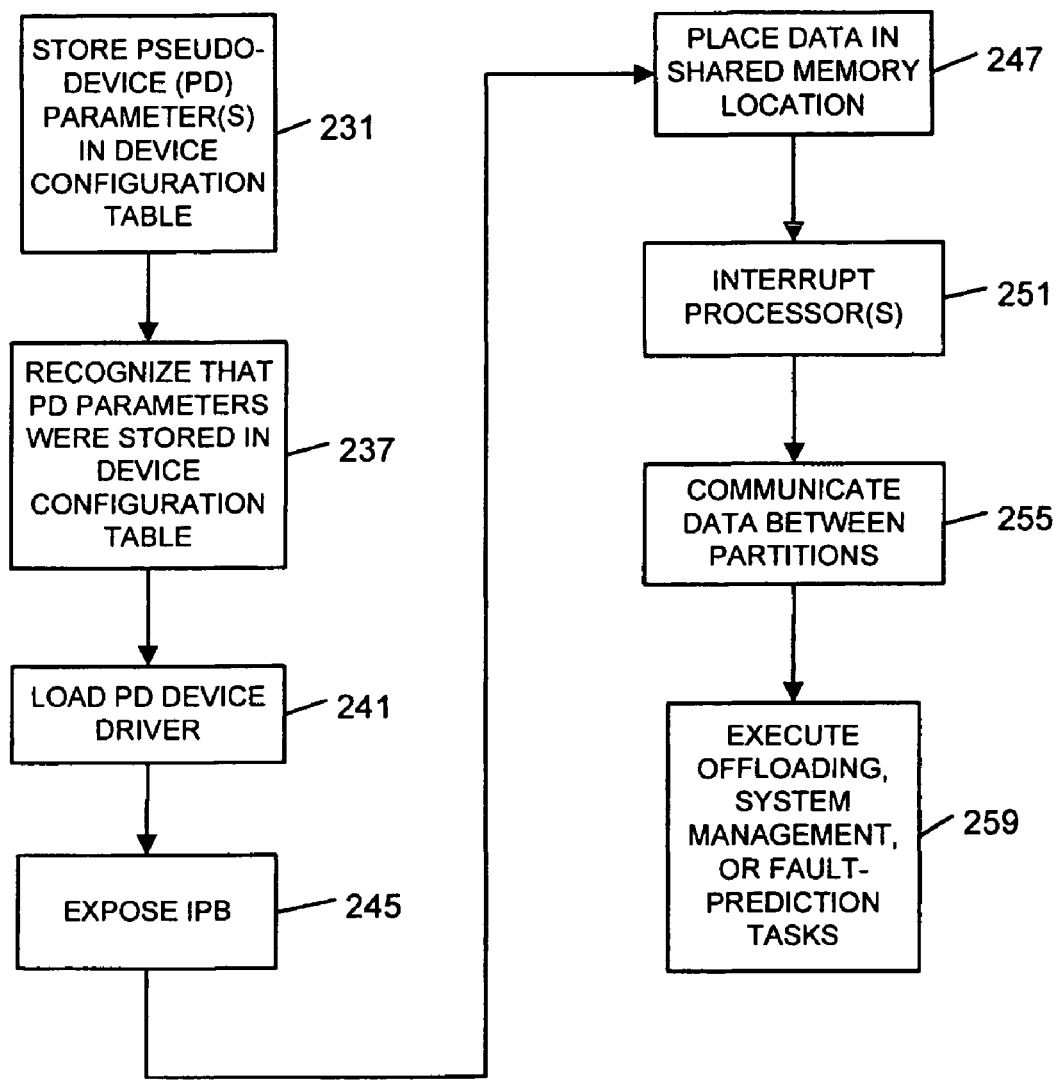
FIG. 2 is a flow diagram illustrating several methods according to various embodiments of the invention.

FIG. 2 is a flow diagram representation illustrating several methods according to various embodiments of the invention. It may be desirable under some circumstances to enable communications between a first partition and a second, sequestered partition in a multi-partition computing platform. Until exposed, selected devices comprising the second partition may remain unidentified to an OS associated with the first partition during initialization of the first partition.

A method 200 may begin at block 231 with storing one or more parameters associated with a pseudo-device in a device configuration table associated with the first partition, at block 231. The parameter(s) may be stored using a device configuration writer module, perhaps before initializing the OS. The device configuration table may be associated with one or more ACPI tables. The device configuration table may comprise a subset of an ACPI, for example. The parameter(s) may also be made available to the second partition.

The parameter(s) may include memory addresses, interrupt vectors, or other parameters associated with the communications between the first partition and the second partition. The method 200 may include recognizing that the parameter(s) were stored in the device configuration table, at block 237. A PnP manager associated with the OS may watch the contents of the device configuration table, and may be triggered by changes to the table. The method 200 may also include loading a device driver associated with the pseudo-device, perhaps in response to the device configuration table parameter additions, at block 241.

The method 211 may include exposing an IPB to an OS executing in the first partition, at block 245. The IPB may be adapted to couple the first partition to the second partition, perhaps as a communication channel configured by the parameter(s). Such communication channel may comprise a memory shared between the first partition and the second partition for communication purposes. An interrupt signaling technique may be used in conjunction with the shared memory to implement the IPB.

According to some embodiments, for example, the parameter(s) may comprise a first interrupt vector, a second interrupt vector, or both. The method 200 may include placing data in a shared memory location accessible by both the first partition and the second partition, at block 247. The method may then interrupt one or more processor(s) associated with the first partition, the second partition, or both to indicate an availability of the data, at block 251. The method 200 may thus include communicating the data between the first partition and the second partition over the IPB, at block 255. Thus exposed, the IPB and the second partition may be used to execute one or more of an off-loading task, a system management task, and a fault prediction task, at block 259.

It may be possible to execute the activities described herein in an order other than the order described. And, various activities described with respect to the methods identified herein can be executed in repetitive, serial, or parallel fashion. Information including parameters, commands, operands, and other data can be sent and received in the form of one or more carrier waves.

One of ordinary skill in the art will understand the manner in which a software program can be launched from a computer-readable medium in a computer-based system to execute the functions defined in the software program. Various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 3 below.

Figure 3:
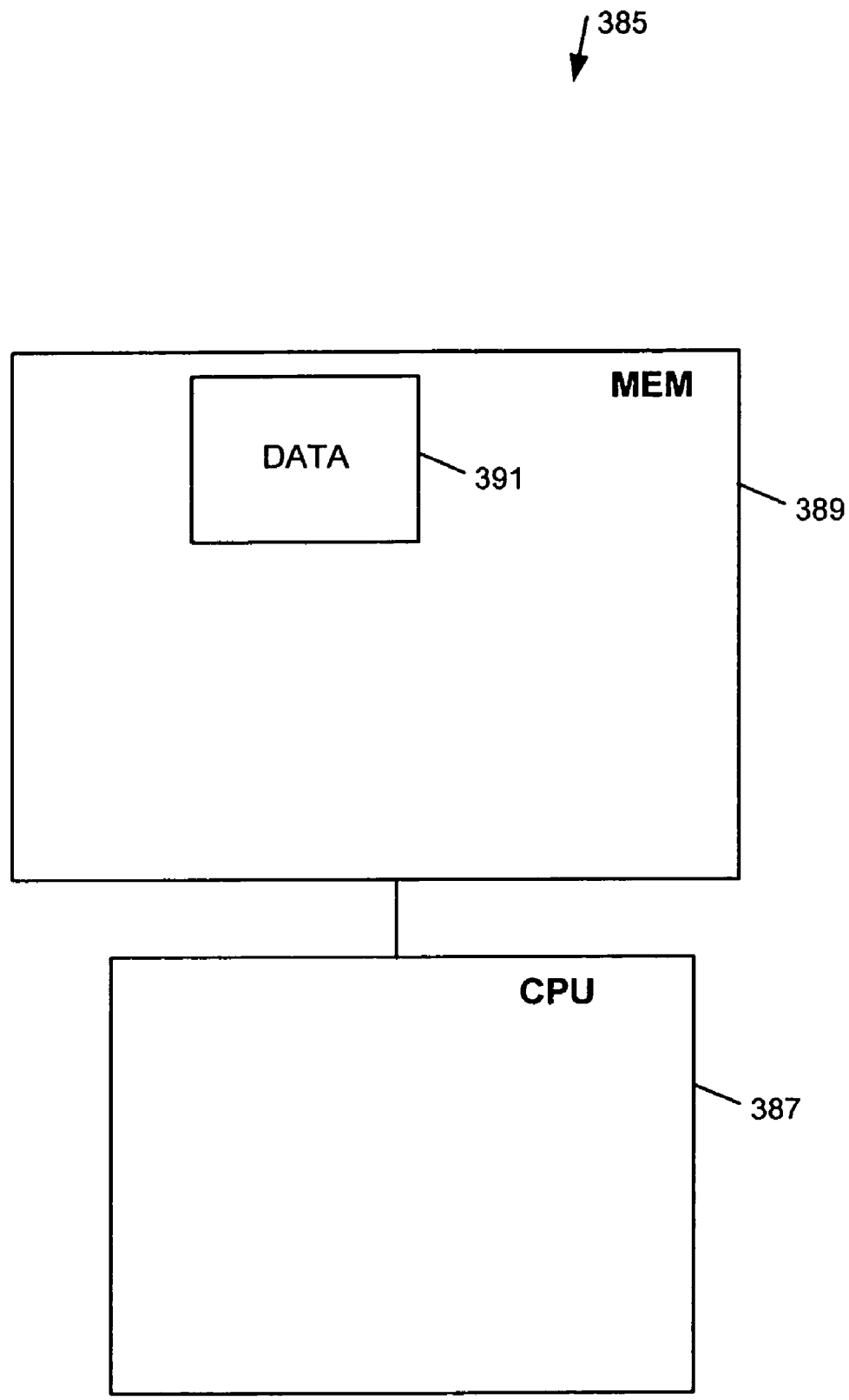
FIG. 3 is a block diagram of an article according to various embodiments of the invention.

FIG. 3 is a block diagram of an article 385 according to various embodiments of the invention. Examples of such embodiments may comprise a computer, a memory system, a magnetic or optical disk, some other storage device, or any type of electronic device or system. The article 385 may include one or more processor(s) such as a central processing unit (CPU) 387 coupled to a machine-accessible medium such as a memory 389 (e.g., a memory including electrical, optical, or electromagnetic elements). The medium may contain associated information 391 (e.g., computer program instructions, data, or both) which, when accessed, results in a machine (e.g., the CPU 387) performing the activities as previously described.

Implementing the apparatus, systems, and methods disclosed herein may operate to expose a sequestered partition to a legacy partition on a multi-partition computing platform, perhaps without additional hardware cost. The partitions may then communicate with each other over an IPB.

Embodiments of the present invention may be implemented as part of any wired or wireless system Examples may also include embodiments comprising multi-carrier wireless communication channels (e.g., OFDM, DMT, etc.) such as may be used within a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and like communication systems, without limitation.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A method, including:
    storing at least one parameter associated with a pseudo-device in a device configuration table associated with a first partition within a multi-partition computing platform, wherein access to the device configuration table is limited to the first partition;
    exposing an inter-partition bridge (IPB) to an operating system (OS) executing in the first partition, wherein the IPB is adapted to couple the first partition to a second partition sequestered from the first partition, wherein the IPB comprises a shared memory accessible by both the first and second partitions, and wherein the IPB is configured by the at least one parameter; and
    making the at least one parameter available to the second partition from the first partition via the shared memory.

2. The method of claim 1, wherein the at least one parameter is stored using a device configuration writer module at a time before initializing the OS.

3. The method of claim 1, wherein the device configuration table comprises a table associated with at least one advanced configuration and power interface (ACPI) table.

4. The method of claim 1, further including:
    recognizing that the at least one parameter was stored in the device configuration table; and
    loading a device driver associated with the pseudo-device.

5. The method of claim 1, wherein the IPB comprises a communication channel between the first and second partitions.

6. The method of claim 5, wherein the communication channel utilizes an interrupt signaling technique.

7. The method of claim 1, wherein the at least one parameter comprises at least one of a first interrupt vector and a second interrupt vector.

8. The method of claim 1, further including:
    placing data in a shared memory location accessible by both the first partition and the second partition; and
    interrupting a processor associated with at least one of the first partition and the second partition to indicate an availability of the data.

9. The method of claim 1, further including:
    communicating data between the first partition and the second partition over the IPB.

10. A computer-readable medium having instructions stored thereon, wherein the instructions, when executed by a computer, cause the computer to perform:
   storing at least one parameter associated with a pseudo-device in a device configuration table associated with a first partition within a multi-partition computing platform, wherein access to the device configuration table is limited to the first partition;
   exposing an inter-partition bridge (IPB) to an operating system (OS) executing in the first partition, wherein the IPB is adapted to couple the first partition to a second partition sequestered from the first partition, wherein the IPB comprises a shared memory accessible by both the first and second partitions, and wherein the IPB is configured by the at least one parameter; and
   making the at least one parameter available to the second partition from the first partition via the shared memory.

11. The medium of claim 10, wherein the instructions, when executed by the computer, cause the computer to further perform:
   executing at least one of an off-loading task, a system management task, and a fault prediction task using the second partition.

12. The medium of claim 10, wherein the instructions, when executed by the computer, cause the computer to further perform:
   placing data in a shared memory location accessible by both the first partition and the second partition; and
   interrupting a processor associated with at least one of the first partition and the second partition to indicate an availability of the data.

13. An apparatus, including:
   first and second partitions in a multi-partition computing platform, the second partition sequestered from an operating system (OS) associated with the first partition; and
   a device configuration table associated with the first partition to contain at least one parameter associated with a pseudo-device, wherein access to the device configuration table is limited to the first partition, and the at least one parameter is used to configure an inter-partition bridge (IPB) established to couple the first partition to the second partition, the IPB comprising a shared memory accessible by both the first and second partitions and the IPB configured to make the at least one parameter available to the second partition from the first partition via the shared memory.

14. The apparatus of claim 13, wherein the device configuration table comprises a table associated with at least one advanced configuration and power interface (ACPI) table.

15. The apparatus of claim 13, further including:
   a pseudo-device driver module coupled to the OS to pass data to the IPB.

16. The apparatus of claim 15, further including:
   an application module coupled to the pseudo-device driver module to utilize the sequestered partition to perform a specialized processing function.

17. The apparatus of claim 15, further including:
   a device configuration reader module coupled to the device configuration table to read the at least one parameter during an initialization of the OS.

18. The apparatus of claim 17, further including:
   a plug-and-play manager coupled to the device configuration reader module to recognize that the at least one parameter has been stored in the device configuration table and to activate the pseudo-device driver module.

19. The apparatus of claim 13, further including:
   a first processor in the first partition communicatively coupled to a second processor in the second partition to interrupt the second processor to advise of a pending communication from the first partition to the second partition on the IPB.

20. The apparatus of claim 19, wherein the second processor is adapted to interrupt the first processor to advise of a pending communication from the second partition to the first partition on the IPB.

21. The apparatus of claim 19, wherein the first processor comprises a bootstrap processor and the second processor comprises an application processor.

22. The apparatus of claim 13, further including:
   a device configuration writer module coupled to the device configuration table to write the at least one parameter to the device configuration table.

23. The apparatus of claim 13, further including:
   an embedded execution environment within the second partition to manage processes executing within the second partition.

24. The apparatus of claim 23, further including:
   a pseudo-device back-end driver within the embedded execution environment to transfer data between the embedded execution environment and the IPB.

* * * * *